United States Patent
Loge

[15] 3,654,911
[45] Apr. 11, 1972

[54] SURGICAL DRILL
[72] Inventor: Hans Loge, Biberach (Riss), Germany
[73] Assignee: Kaltenbach & Voigt, Biberach (Riss), Germany
[22] Filed: Mar. 23, 1970
[21] Appl. No.: 21,680

[30] Foreign Application Priority Data

Mar. 27, 1969 Germany..................P 19 15 667.3

[52] U.S. Cl..............................................128/305, 279/95
[51] Int. Cl.....................A61b 17/32, B25g 3/22, B23b 5/34
[58] Field of Search..................32/27; 128/305, 41; 279/51, 279/52, 53, 95, 26

[56] References Cited

UNITED STATES PATENTS

| | | | |
|---|---|---|---|
| 1,170,523 | 2/1916 | Fernald | 32/27 X |
| 1,548,180 | 8/1925 | Brown et al. | 32/27 |
| 2,735,688 | 2/1956 | Duchesneau et al. | 279/53 |
| 3,224,784 | 12/1965 | Harbart | 279/102 X |

Primary Examiner—Channing L. Pace
Attorney—Michael S. Striker

[57] ABSTRACT

A surgical drill wherein a driven spindle is formed with an axial through bore and accommodates an axially movable clamping member which can either engage or release an elongated drilling tool. A nut is employed to move the clamping member between a first axial position in which the clamping member receives torque from the spindle and rotates the tool, and a second axial position in which the tool can be shifted axially of the clamping member and spindle so as to move a desired length of the tool beyond the spindle, to wit: a length which is sufficient to permit deeper penetration into a bone or the like but not enough to permit uncontrolled flexing of the tool. The axial length of the toll may exceed several times the axial length of the spindle.

8 Claims, 2 Drawing Figures

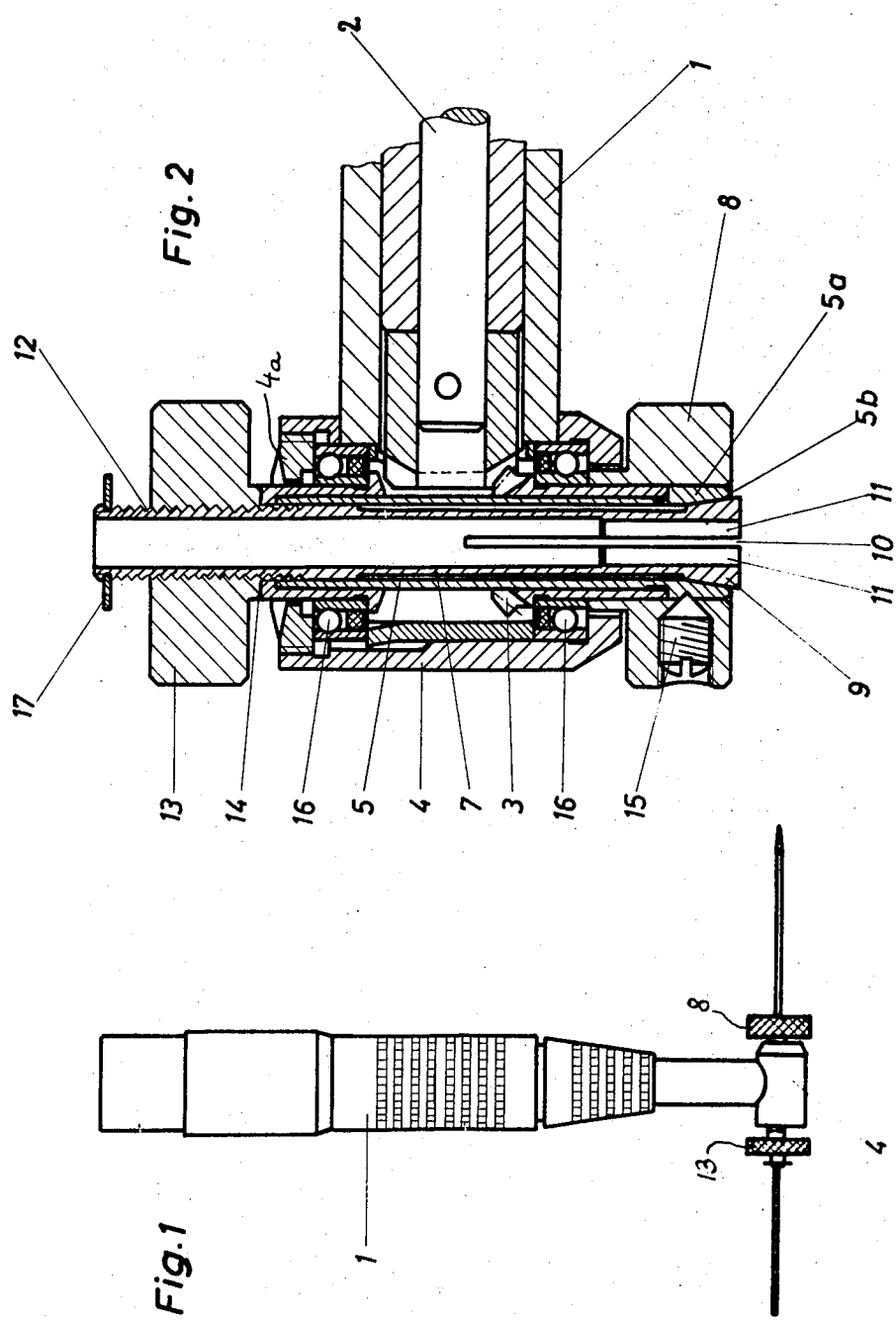

SURGICAL DRILL

BACKGROUND OF THE INVENTION

The present invention relates to drills in general, and more particularly to improvements in a surgical drill of the type adapted to be used by dentists or surgeons to drill holes or bores in teeth, bones or the like.

At the present time, the working end of a surgical drill is designed in such a way that the drilling tool is insertable into a blind bore of the spindle which is rotated to thereby rotate the tool during penetration into a hard substance. Problems arise when the tool is to drill a relatively deep bore, for example, lengthwise through a phalanx in a finger of the hand. A slender tool of considerable length is likely to flex if it extends well beyond the spindle, i.e., if the length of its exposed portion at least equals the maximum depth of the bore. Flexing is particularly likely to occur during the initial stage of a drilling operation.

Attempts to avoid flexing of slender boring tools include the provision of a linkage which is mounted on a sleeve for the revolving spindle and is movable axially of the spindle. The linkage carries a guide in the form of a plate having a perforation for the tool. During the initial stage of drilling a deep bore, the plate is moved at a maximum distance from the spindle to support and guide the tool at a point close to the tip. As the drilling progresses, the surgeon gradually retracts the plate toward the spindle and thereby exposes an increasing part of the tool for penetration into the bone. As a rule, the plate abuts against or is immediately adjacent to the body of the patient, namely, to the portion of the body into which the tool penetrates. Thus, the plate prevents direct observation of the point where the tool penetrates into the body. Furthermore, the aforementioned linkage for the plate interferes with rapid, convenient and thorough sterilization of the drill.

SUMMARY OF THE INVENTION

An object of the invention is to provide a surgical drill wherein the tool is guided and mounted in a novel and improved way so that its guide means does not interfere with observation of the point where the tip of the tool penetrates into the anatomy.

Another object of the invention is to provide a surgical drill which can accept relatively short or very long tools, which can properly retain and guide rigid as well as flexible tools, and which can be readily taken apart for inspection, cleaning and/or replacement of its parts.

A further object of the invention is to provide novel means for coupling the tool of a surgical drill for rotation with the spindle, particularly with a spindle which is driven by way of a flexible shaft or the like.

An additional object of the invention is to provide a surgical drill which is simpler and more compact than presently known drills and which is particularly suited to prevent flexing of slender elongated drilling tools during the initial stage of penetration into a bone or the like.

The invention is embodied in a drill, particularly in a surgical drill which can make holes or bores with elongated slender drill wires or other types of rotary drilling tools. The drill comprises an elongated hollow holder or handle, a bearing sleeve secured to one end of the holder and having an axis which is inclined and preferably normal with reference to the longitudinal direction of the holder, a rotary drive member mounted in the holder, a hollow spindle rotatably mounted in the sleeve and receiving torque from the drive member, preferably by way of a transmission including bevel gears, a hollow tool clamping member movable axially of the spindle between a first position in which the clamping member receives torque from the spindle and transmits torque to an elongated tool which is received in and can extend beyond both axial ends of the clamping member and a second position in which the tool is movable axially of the clamping member, and actuating means for moving the clamping member between such positions. Since the tool can extend beyond both axial ends of the tubular clamping member and beyond both axial ends of the spindle, it can be initially fixed in an axial position in which its tip extends only slightly from the clamping member. Once the hole is drilled to a certain depth, the axial position of the tool is changed once or more than once, always with a view to expose such length of the tool as is warranted in order to prevent flexing and/or breakage. Thus, by the simple expedient of using a spindle which is open at both ends and by using a clamping member which can grip or release the tool and is rotatable with the spindle, the drill can employ tools whose axial length is a multiple of the axial length of the spindle.

The novel features which are considered as characteristic of the invention are set forth in particular in the appended claims. The improved surgical drill itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of the working end of a surgical drill which embodies the invention; and FIG. 2 is an enlarged central sectional view of a portion of the structure shown in FIG. 1.

DESCRIPTION OF THE PREFERRED EMBODIMENTS

The drawing illustrates the working end of a surgical drill which comprises an elongated hollow handle or holder 1 which can be gripped by hand while the tool 6 (e.g., a piece of drilling wire) is caused to penetrate into a bone. The holder 1 accommodates a rotary drive shaft 2 which receives motion from an electric motor (not shown) by way of a flexible shaft or the like. The latter can be coupled to the shaft 2 at the rear end of the holder 2. A bearing sleeve 4 is secured to the free end of the holder 1 and accommodates a rotary spindle 5 which receives torque from the drive shaft 2 by way of a transmission including bevel gears 3. The spindle 5 is formed with an axial through bore which accommodates the major part of a tubular clamping member 7 for the tool 6.

One end portion 5a of the spindle 5 extends beyond the adjacent end of the sleeve 4 and is provided with a conical internal surface 5b which flares outwardly, i.e., away from the sleeve 4, and abuts against a complementary conical external surface of a clamping or gripping portion 9 of the clamping member 7. The clamping portion 9 is provided with axially parallel slots 10 which form several prongs or tongues 11 movable radially of the clamping member 7 to respectively engage with or to be disengaged from the tool 6 in response to axial movement of the clamping portion 9 with reference to the end portion 5a. The latter carries an annular handgrip portion 8 which is separably secured thereto by a radial screw 15 or a like fastener.

The other end portion 12 of the clamping member 7 extends beyond the respective end portion of the spindle 5 and is provided with external threads mating with internal threads of an actuating member here shown as a nut 13 which can be rotated by hand to thereby move the clamping member 7 axially between a first position in which the conical internal surface 5b causes the prongs 11 to move radially inwardly and to fixedly engage the adjacent portion of the tool 6 and a second position in which the prongs 11 of the end portion 9 can move radially outwardly to relax the pressure on the tool 6 so that the latter can be shifted axially. When the nut 13 is rotated in a direction to move the clamping member 7 to the first position, it bears against an end face 14 of the spindle 5. With reference to FIG. 2, the clamping member 7 is caused to move upwardly when it advances to its first position and downwardly when it enables the prongs 11 to relax the radial compressive stress upon the tool 6. During rotation of the nut 13 in a direction to move the clamping member 7 to its first or operative position, the user grasps the handgrip portion 8 with the other hand to prevent rotation of the spindle 5 with the clamping member. The handgrip portion 8 is also held with one hand when the other hand rotates the nut 13 in a direction to relax the radial stress upon the tool 6. The fastener 15 has a conical tip which extends into a recess provided therefor in the periphery of the end portion 5a. FIGS. 1 and 2 show that the maximum diameter of the nut 13 equals or approximates the maximum diameter of the handgrip portion 8 and that such maximum diameter slightly exceeds the external diameter of the sleeve 4. This was found to be particularly convenient for proper manipulation of the parts 8 and 13 when the user wishes to clamp or to release the tool 6. FIG. 1 shows that the nut 13 and the handgrip portion 8 are provided with milled, knurled or otherwise roughened peripheral surfaces to facilitate rotation.

FIG. 2 illustrates that the spindle 5 rotates in radial antifriction bearing 16 which are mounted in the sleeve 4. An advantage of the end face 14 is that it prevents excessive axial stressing of the bearings 16 when the nut 13 is rotated in a direction to move the clamping member 7 axially to operative position, i.e., the nut 13 bears directly against the spindle 5 but not against the sleeve 4.

The outermost end of the externally threaded end portion 12 is provided with a circumferential groove for a flat preferably U-shaped retainer 17 which extends radially beyond the threads and serves as a stop for the nut 13. The legs of the retainer 17 are preferably elastic so that the latter tends to remain in the illustrated position even though it is not positively or permanently secured to the clamping member 7. When the drill is in use, the retainer 17 prevents accidental separation of nut 13 from the clamping member 7. However, when the drill is to be cleaned or sterilized, the user simply removes the retainer 17 radially of the externally threaded end portion 12 to permit complete separation of the nut 13 and subsequent withdrawal of the clamping member 7 from the spindle 5 to facilitate cleaning, disinfection or other treatment.

An important advantage of the improved drill is that it reduces the likelihood of flexing and/or breakage of the tool 6, especially when the tool is rather long and thin and is to be driven into a hard substance, particularly during the initial stage of a drilling operation. For example, the tool 6 may constitute a piece of drilling wire having a length of 10–12 centimeters, the sleeve 4 may have a diameter of about 1 centimeter and an axial length of 1.5–2 centimeters. When the user wishes to use such an elongated tool for drilling of a relatively deep bore, the tool is initially fixed in an axial position in which its tip extends only slightly beyond the prongs 11 of the clamping portion 9, i.e., the tool extends beyond the handgrip portion 8 only to the extent necessary to positively prevent flexing during initial penetration into a bone or the like. When the tip of the tool 6 has drilled a bore of certain depth, the user manipulates the nut 13 and simultaneously grips the handgrip portion 8 to relax the radial stress on the tool 6 and thereupon moves the tool axially to advance its tip further away from the handgrip portion 8. The user thereupon rotates the nut 13 in a direction to reengage the prongs 11 with the tool 6 and to insure that the spindle 5 transmits torque to the clamping member 7 as well as that the member 7 transmits torque to the tool 6 as soon as the drive shaft 2 is set in rotary motion. The same procedure can be repeated at least once, depending on the desired depth of the bore, on the flexibility of the tool 6 and on the consistency of the substance in which the bore is to be formed.

As shown in FIG. 1, the improved drill is designed in such a way that the parts 4, 8 and 13 do not interfere with observation of the location where the bore is drilled by the tool 6. This is due to the fact that the diameters of the parts 8, 13 are only slightly larger than the external diameter of the sleeve 4. For example, if the external diameter of the sleeve 4 is 1 centimeter, the maximum diameter of the nut 13 and/or hand grip portion 8 need not exceed 1.1 centimeter. Since the clamping member 7 is readily removable from the spindle 5 (upon detachment of the nut 13 and retainer 17), it can be sterilized independently of the sleeve 4, spindle 5 and tool 6. The handgrip portion 8 is separated from the end portion 5a when the spindle 5 is to be withdrawn from the sleeve 4 for inspection, cleaning, repair and/or replacement. A removable ring 4a meshes with the sleeve 4 to hold the upper antifriction bearing 16 in the position shown in FIG. 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In a handpiece for a drill, particularly a handpiece for a surgical drill, a combination comprising an elongated hollow holder; a bearing sleeve secured to one end of and transverse to said holder; a rotary drive member mounted in said holder; a tubular spindle mounted in said sleeve and receiving torque from said drive member, said spindle having a first end portion extending beyond one end of said sleeve and a second end portion; a tubular tool clamping member received in and movable axially of said spindle between a first position in which the clamping member receives torque from said spindle and transmits torque to a drilling tool which is inserted into said clamping member, and a second position in which the tool is movable lengthwise of the clamping member, said clamping member including an externally threaded portion extending beyond the second end portion of said spindle; actuating means for moving the clamping member between said positions and comprising a nut meshing with said externally threaded portion and abutting against the second end portion of said spindle at least in the second axial position of said clamping member; and a grip member secured to said first end portion of said spindle to prevent rotation of the spindle while the nut is being tightened against the said second end portion of said spindle.

2. A combination as defined in claim 1, wherein said nut and said annular grip member have outer knurled surfaces.

3. A combination as defined in claim 1, wherein said clamping member further comprises a clamping portion including a plurality of radially movable tool-engaging prongs, said prongs being arranged to move radially inwardly in response to axial movement of said clamping member to the first position thereof.

4. A combination as defined in claim 3, wherein said clamping portion is provided with an external conical surface and said first end portion of said spindle is provided with a complementary internal conical surface along which said external conical surface slides in response to movement of said clamping member between said positions.

5. A combination as defined in claim 1, wherein said grip member is separable from the remainder of said spindle.

6. A combination as defined in claim 1, wherein the maximum diameter of said nut at least approximates the maximum diameter of said annular grip member.

7. A combination as defined in claim 6, wherein said maximum diameter exceeds the external diameter of said sleeve.

8. A combination as defined in claim 1, wherein the axis of said spindle is normal to the axis of said drive member and further comprising a transmission including bevel gears for rotating said spindle in response to rotation of said drive member.

* * * * *